Sept. 26, 1961  B. STORSAND  3,002,071
HEAVY DUTY FUSE
Filed Oct. 7, 1958

INVENTOR:
Bjarne Storsand
by
Frederick Breitenfeld
Attorney

United States Patent Office 3,002,071
Patented Sept. 26, 1961

3,002,071
HEAVY DUTY FUSE
Bjarne Storsand, Zurich, Switzerland, assignor to Oerlikon Engineering Company, Zurich, Switzerland, a corporation of Switzerland
Filed Oct. 7, 1958, Ser. No. 765,897
Claims priority, application Switzerland Nov. 11, 1957
1 Claim. (Cl. 200—120)

This invention relates to a fuse for heavy currents particularly for semi-conductor rectifying plant.

Figure 1:
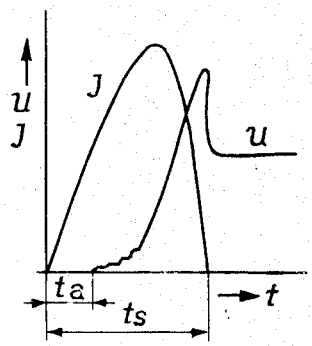

The occurrence of a short circuit entrains a course of events which is illustratively represented in a simplified form in FIGURE 1 of the accompanying drawings which shows that there is first an abrupt rise in the magnitude of the current J, but that as soon as the fuse responds, the current again rapidly falls. U represents the potential drop which arises across the fuse. This does not develop until after a certain period of delay $t_a$ in response has elapsed. The potential peak is due to the high rate of change of the magnitude of the current.

In modern heavy duty fuses the total rupturing time $t_s$ is in the order of magnitude of about 50 millisecs. For many purposes, for instance for protecting heavy duty plant incorporating semi-conductor rectifying equipment, such a rupturing time is much too long. High-speed circuit breakers would permit the period of delay in response to be reduced to about 4 millisecs. and the total rupturing time to roughly 15 millisecs, but the cost of such circuit breakers would be excessively high.

The present invention aims at providing a heavy duty fuse which will be as rapid in action as a modern high-speed circuit breaker when a short circuit arises.

According to the invention this is achieved by giving the fuse wire both ends of which are held in metal blocks rated current densities over 300 amps./sq. mm., and providing a magnetic blow-out for quenching the arc, the coil of the blow-out simultaneously serving to limit the magnitude of the current surge in the circuit. These measures permit the provision of a cheap high-speed protective device. Moreover, the major advantage is gained that the potential surge which develops in the plant can be considerably reduced in ratio with rising inductance of the current limiting coil.

The dimensional specification which applies to the present invention is determined by the following considerations:

It can be shown that the period of response $t_a$ of a fuse can be approximately calculated from the formula:

$$t_a = A/(s^2.n^2)$$

A being a constant characteristic of the material, $s$ the rated current density, i.e. the ratio of rated current and the cross section of the fuse wire, and $n$ the ratio of maximum surge current and rated current. The relevant quantities are conveniently related to the following units: $t_a$(secs.), A(sec.A$^2$/mm.$^4$), $s$(A/mm.$^2$). The constant A is determined generally by the equation:

$$A = (c.T_s + c_s)/\delta$$

wherein $c$ (cal./° C. cm.$^3$) = specific heat, $T_s$(° C.) = fusing temperature, $c_s$ (cal./cm.$^3$) = heat of fusion, $\delta(\Omega \text{mm.}^2/\text{m.})$ = resistivity.

In the case of a silver wire A is approximately 160,000 (sec. A$^2$/mm.$^4$). By making $s=600$, $n=10$, $t_a$ will become 4.5 millisecs. In other words, by giving the wire suitable dimensions, periods of delay in response can be achieved which are otherwise only equalled by high-speed circuit-breakers.

The length $l$ of the fuse wire still remains to be determined. Calculations and experimental tests have shown that the following equation holds:

$$l = \sqrt{(B.T)/s^2}$$

wherein $l$ (cms.) is the length of the fuse wire, B(cm.$^2$ A$^2$/° C. mm.$^4$) is a constant characteristic of the material, T(° C.) the permissible maximum excess temperature at the centre of the fuse wire and $s$(amp./mm.$^2$) the rated current density. Whereas T can be determined empirically, B can be calculated from formula $$B = (6.\lambda)/\delta$$

wherein $\delta$ is again the specific resistance and $\lambda$(cal./cm. ° C.) the thermal conductivity of the fuse wire.

When using silver, B is about 1100 (cm.$^2$ A$^2$/° C. mm.$^4$). From the above equations for $t_a$ and $l$ the following formula for $t_a$ arises:

$$t_a = (A.l^2)/(B.n^2.T)$$

If $n$ is 10 and $T=460$, $t_a$ for silver can be readily calculated from $$t_a = 0.003.l^2$$

Assuming the length of the wire to be 2 cms., $t_a$ will be 12 millisecs., and for $l=1$ cm., $t_a$ will be 3 millisecs. The length of a silver fuse wire must therefore be less than 2 cms.

The formula can be stated in terms of the length of the fuse wire as follows:

$$l = \sqrt{\frac{6 t_a \lambda n^2 T}{c T_s + c_s}}$$

Figure 3:
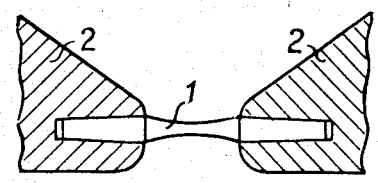
Figure 2:
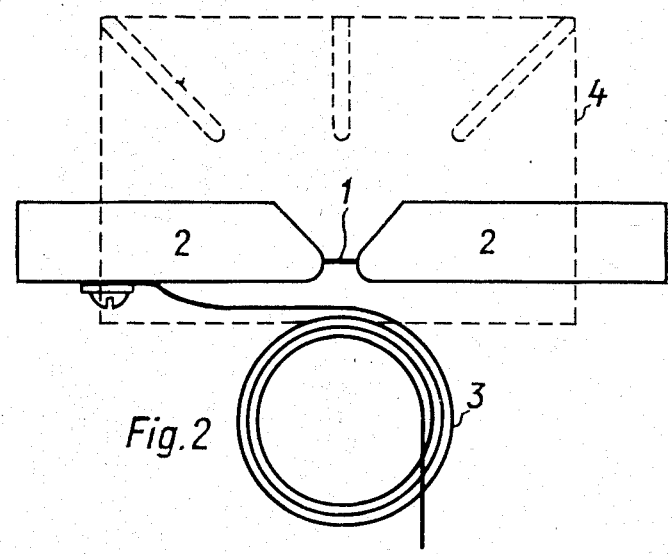
Figure 4:
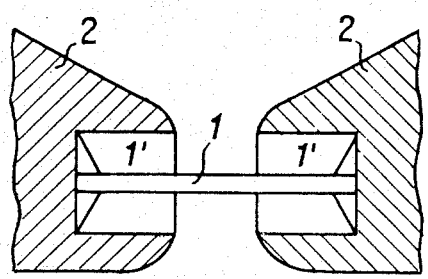

In order to enable the invention to be more readily understood, reference is made to FIGURES 2 to 4 of the accompanying drawings which illustrate diagrammatically and by way of example, embodiments of the invention.

FIGURE 2 shows a fuse wire 1 secured between metal blocks 2. 3 is a magnetic blow-out and 4 an arcing chimney. The blocks 2 may be subjected to intense cooling by appropriate means.

In FIGURE 3 in which like parts are indicated by like reference numerals as in FIGURE 2, a special form of construction of the fuse wire is shown. The cross section of the wire is less in the centre than at the two ends. This arrangement permits the period of delay in response to be further reduced.

In order to provide a reliable soldered bond between the fuse wire and the metal blocks when a silver fuse wire is used, the ends of the latter may first be embedded in silver blocks 1' and the latter in blocks 2 of some other material.

What I claim is:

In a rapid-acting heavy-duty protective device for semi-conductor rectifier installations in which a current-surge-limiting coil is in series with a fuse wire mounted in an arc chimney, and in which the current density in the fuse wire exceeds 300 amperes per square millimeter, a fuse wire whose length is no greater than $$l = \sqrt{\frac{6 t_a \lambda n^2 T}{c T_s + c_s}}$$

where $l$ = length of fuse wire (centimeters),
$t_a$ = time delay before fuse response (seconds),
$\lambda$ = thermal conductivity of the fuse wire (calories/centimeter degree centigrade),
$n$ = maximum surge current/rated current (amperes),
$T$ = permissible maximum excess temperature at the center of the fuse wire (degree centigrade),
$c$ = specific heat of the fuse wire (calories/degree centigrade cubic centimeters), $T_s$ = fusing temperature of the fuse wire (degree centigrade), and
$c_s$ = heat of fusion of the fuse wire (calories/cubic centimeter).

References Cited in the file of this patent

UNITED STATES PATENTS

| | | |
|---|---|---|
| 1,055,877 | Carichoff | Mar. 11, 1913 |
| 2,157,906 | Lohausen | May 9, 1939 |
| 2,780,696 | Lear | Feb. 5, 1957 |
| 2,794,097 | Jacobs | May 28, 1957 |
| 2,847,537 | Kozacka | Aug. 12, 1958 |

FOREIGN PATENTS

| | | |
|---|---|---|
| 12,292 | Great Britain | May 29, 1902 |